(12) United States Patent
Hetzler et al.

(10) Patent No.: US 11,774,237 B2
(45) Date of Patent: Oct. 3, 2023

(54) METHOD FOR CALIBRATING A MEASURING APPARATUS

(71) Applicant: Carl Zeiss SMT GmbH, Oberkochen (DE)

(72) Inventors: Jochen Hetzler, Aalen (DE); Stefan Schulte, Stoedtlen (DE); Matthias Dreher, Oberkochen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 0 days.

(21) Appl. No.: 17/676,468

(22) Filed: Feb. 21, 2022

(65) Prior Publication Data

US 2022/0187061 A1  Jun. 16, 2022

Related U.S. Application Data

(63) Continuation of application No. PCT/EP2020/072736, filed on Aug. 13, 2020.

(30) Foreign Application Priority Data

Aug. 22, 2019 (DE) .................... 10 2019 212 614.6

(51) Int. Cl.
*G01B 11/25* (2006.01)
*G01B 9/021* (2006.01)
(Continued)

(52) U.S. Cl.
CPC .......... *G01B 11/2504* (2013.01); *G01B 9/021* (2013.01); *G01B 9/02039* (2013.01);
(Continued)

(58) Field of Classification Search
CPC ............ G01B 9/02039; G01B 9/02057; G01B 9/02072; G01B 9/021; G01B 9/023; G01B 11/2441; G01B 11/254; G01B 11/2504
See application file for complete search history.

(56) References Cited

U.S. PATENT DOCUMENTS 6,057,922 A   5/2000 Hayden
7,436,520 B1* 10/2008 Doerband .......... G01B 9/02057
356/512
(Continued)

FOREIGN PATENT DOCUMENTS

DE   102011080437 A1   4/2012
DE   102012217800 A1   4/2014
(Continued)

OTHER PUBLICATIONS

Reichelt, Stephan et al. "New design techniques and calibration methods for CGH-null testing of aspheric surfaces". Proc. SPIE 4778, Interferometry XI: Applications, Jun. 19, 2002. (Year: 2002).*
(Continued)

*Primary Examiner* — Michael A Lyons
(74) *Attorney, Agent, or Firm* — Edell, Shapiro & Finnan, LLC (57) ABSTRACT

A method for calibrating a measuring device (10) for interferometrically determining a shape of an optical surface (12) of an object under test (14). The measuring device includes a module plane (32) for arranging a diffractive optical test module (30) which is configured to generate a test wave (34) that is directed at the optical surface and that has a wavefront at least approximately adapted to a target shape (60) of the optical surface. The method includes: arranging a diffractive optical calibration module (44) in the module plane for generating a calibration wave (80), acquiring a calibration interferogram (88) generated using the calibration wave in a
(Continued)

detector plane (43) of the measuring device, and determining a position assignment distribution (46) of points (52) in the module plane to corresponding points (54) in the detector plane from the acquired calibration interferogram.

12 Claims, 4 Drawing Sheets

(51) Int. Cl.
  *G01B 11/24*      (2006.01)
  *G01B 9/02*       (2022.01)
  *G01B 9/02056*    (2022.01)
  *G01B 9/02055*    (2022.01)
  *G01M 11/00*      (2006.01)

(52) U.S. Cl.
  CPC ..... *G01B 9/02057* (2013.01); *G01B 9/02072* (2013.04); *G01B 11/2441* (2013.01); *G01B 11/254* (2013.01); *G01M 11/005* (2013.01)

(56) References Cited

U.S. PATENT DOCUMENTS

| | | | |
|---|---|---|---|
| 8,269,981 B1* | 9/2012 | Doerband | G01B 11/2441 356/512 |
| 2013/0188246 A1 | 7/2013 | Rogalsky et al. | |
| 2015/0198438 A1* | 7/2015 | Hetzler | G01M 11/005 356/458 |
| 2018/0106591 A1* | 4/2018 | Hetzler | G01M 11/0264 |
| 2019/0271532 A1 | 9/2019 | Schulte et al. | |
| 2020/0225028 A1 | 7/2020 | Hetzler et al. | |

FOREIGN PATENT DOCUMENTS

| | | |
|---|---|---|
| DE | 102013212492 A1 | 7/2014 |
| DE | 102013226668 A1 | 6/2015 |
| DE | 102014117511 A1 | 6/2016 |
| WO | 2006077145 A2 | 7/2006 |
| WO | 2014048574 A1 | 4/2014 |
| WO | 2019063437 A1 | 4/2019 |

OTHER PUBLICATIONS

Zhu, Deyan. "Testing of null correctors by tilted computer-generated holograms with maximum likelihood algorithm". Proc. SPIE 1065, LIDAR Imaging Detection and Target Recognition 2017, 1060539, Nov. 15, 2017. (Year: 2017).*

International Search Report, PCT/EP2020/072736, dated Nov. 24, 2020, 4 pages.

Thompson et al., "Validation of the corrective optics on the Hubble Space Telescope 1st Servicing Mission", Journal of Astronomical Telescopes, Instruments, and Systems, Society of Photo-Optical Instrumentation Engineers, vol. 2, No. 3, Jul. 1, 2016, 9 pages.

Reichelt, "Self-calibration of wavefront testing interferometers by use of diffractive elements" Proc. of SPIE, vol. 6292, Aug. 14, 2006, 10 pages.

Reichelt, "Absolute testing of aspheric surfaces", Proc. of SPIE, vol. 5252, Feb. 26, 2004, 12 pages.

Rees et al., "The use of diffractive imitator optics as calibration artefacts", Proceedings of SPIE, vol. 9575, Aug. 27, 2015, 12 pages.

Novak et al., "Distortion mapping correction in aspheric null testing", College of Optical Sciences, Proc. of SPIE, vol. 7063, (2008), 8 pages.

Zeng et al., "Mapping distortion correction in freeform mirror testing by computer-generated hologram", Applied Optics, vol. 57, No. 34, Dec. 1, 2018, 6 pages.

German Office Action with English translation, Application No. 10 2019 212 614.6, dated Jul. 23, 2022, 8 pages.

International Preliminary Report on Patentability and the Written Opinion, PCT/EP2020/072736, dated Feb. 17, 2022, 22 pages.

* cited by examiner

METHOD FOR CALIBRATING A MEASURING APPARATUS

CROSS REFERENCE TO RELATED APPLICATIONS

This is a Continuation of International Application PCT/EP2020/072736, which has an international filing date of Aug. 13, 2020, and the disclosure of which is incorporated in its entirety into the present Continuation by reference. In addition, the present Continuation claims the benefit of and priority to German patent application 10 2019 212 614.6, filed Aug. 22, 2019. The entire content and disclosure of this German patent application is also incorporated by reference into the present Continuation.

FIELD OF THE INVENTION

The invention relates to a method for calibrating a measuring device for interferometrically determining the shape of the surface of an object under test, a method for determining such a shape of a surface of an object under test, and an optical element comprising an optical surface.

BACKGROUND

For the highly accurate interferometric measurement of a surface shape of an object under test, for instance an optical element for a projection lens of a microlithographic projection exposure apparatus, diffractive optical arrangements are often used as so-called zero optics or compensation optical units. In this case, the wavefront of a test wave is adapted to a target shape of the surface by way of a diffractive element such that the test wave would be incident on the target shape in perpendicular fashion at every location and be reflected back on itself thereby. Deviations from the target shape can be determined by superimposing a reference wave with the reflected test wave. The diffractive element used can be a computer-generated hologram (CGH), for example.

DE 10 2012 217 800 A1 describes such a measurement system. A light wave is initially split into a reference wave and a test wave using a Fizeau element. The test wave is then converted by the complex coded CGH into a test wave having a wavefront that is adapted to the target shape of the surface and calibration waves having a spherical or planar wavefront. To this end, the CGH has suitably designed diffractive structures. The calibration waves are used to calibrate the CGH. An object under test is subsequently arranged in the test position, and a measurement using the test wave is carried out. The test wave is reflected by the surface of the object under test, transformed back by the CGH, and, following the passage through the Fizeau element, the reference wave is superimposed with the test wave. It is possible to determine the shape of the surface from the interferogram acquired in a plane. Here, a very high degree of accuracy is attained due to the calibration of the CGH.

Additionally, to measure the shape of the objects under test it is possible to use test waves whose wavefronts are merely approximated to the target shape of the test surface and are not identical to the latter. This procedure is useful when measuring, e.g., what are known as "nano free-form surfaces", which only deviate slightly from a rotationally symmetric reference surface. The use of a test wave with a likewise rotationally symmetric form lends itself to this case.

To determine the actual shape of the surface to be measured, the difference between the target shape and the wavefront of the test wave must be subtracted from the measurement data determined from the acquired interferogram. However, this evaluation is not sufficiently accurate in many cases.

SUMMARY

It is an object of the invention to provide a method that allows the aforementioned problems to be solved and, in particular, is able to ensure that a shape of an optical surface whose target shape deviates from a rotationally symmetric form, can be determined with improved accuracy.

Solution According to the Invention

According to one formulation, the above-described object can be achieved, for example, using a method for calibrating a measuring device for interferometrically determining a shape of an optical surface of an object under test. The measuring device comprises a module plane for the arrangement of a diffractive optical test module. The test module is configured to generate a test wave that is directed at the optical surface and that has a wavefront at least approximately adapted to a target shape of the optical surface. The calibration method according to the invention comprises: arranging a diffractive optical calibration module in the module plane for the purposes of generating a calibration wave, acquiring a calibration interferogram generated using the calibration wave in a detector plane of the measuring device, and determining a position assignment distribution of points in the module plane to corresponding points in the detector plane from the acquired calibration interferogram.

Expressed differently, the assignment of a respective position of a plurality of points in the module plane to the respective position of the corresponding points in the detector plane is determined. That is to say, the result of the position determination is an assignment distribution, which specifies individual assignments of points.

The position assignment distribution of the points in the module plane to a respective point in the detector plane should be understood to mean the specification of the coordinates in the detector plane to which corresponding coordinates in the module plane are mapped by the optical unit of the measuring device optionally arranged between the module plane and the detector plane. The aforementioned position assignment distribution can also be referred to as lateral assignment between module plane and detector plane. The latter comprises, in particular, parameters such as imaging scale and orthogonality, and higher orders of the lateral position assignment distribution which are referred to as distortion.

The position assignment distribution determined using the calibration method according to the invention allows an improved-accuracy evaluation of an interferogram determined when measuring an object under test using a test wave that is only approximated to the target shape.

In this evaluation, the precise position assignment of the points on the object under test to the corresponding points on the interferometer camera can now be precisely taken into account when removing the difference distribution between the target shape and the wavefront of the test wave by calculation. As a consequence, the resultant measurement result has an improved accuracy in relation to the shape of the optical surface.

According to one embodiment, the measuring device comprises a holding apparatus for holding the test module or the calibration module in the module plane. In particular, the measuring device also comprises a detector for acquiring the interferogram in the detector plane.

According to a further embodiment, a distortion of an optical unit arranged between the module plane and the detector plane is determined by determining the position assignment distribution. A distortion of an optical unit is understood to mean a local change of the imaging scale of the optical unit. The optical unit may comprise one or more optical elements, for example a collimator, a beam splitter and an eyepiece of an acquisition apparatus of the measuring device.

According to a further embodiment, the calibration module has a diffractive structure pattern with a configuration known in advance and the configuration known in advance is used during the determination of the position assignment distribution.

According to an embodiment variant, the diffractive structure pattern of the calibration module comprises a two-dimensionally modulated optical property.

According to a further embodiment, the two-dimensionally modulated optical property brings about a phase modulation in a wave that interacts with the diffractive structure pattern. Expressed differently, the diffractive structure pattern comprises a two-dimensional phase modulation, like, for instance, a two-dimensional cosine grating. Alternatively, the two-dimensionally modulated optical property can bring about an amplitude modulation or intensity modulation in a wave that interacts with the diffractive structure pattern.

Furthermore, the invention provides a method for determining a shape of an optical surface of an object under test. This method comprises an implementation of the calibration method according to any one of the embodiments or exemplary embodiments, described above, for determining the position assignment distribution of points in the module plane to corresponding points in the detector plane. Furthermore, the shape determination method according to the invention comprises an arrangement of the test module in the module plane for the purposes of generating the test wave that is directed at the optical surface, and recording a test interferogram generated using the test wave.

According to one embodiment of the shape determination method, furthermore the shape of the optical surface is determined from the test interferogram with use being made of the position assignment distribution. According to an embodiment variant, the determination of the shape of the optical surface is furthermore implemented while taking account of a further position assignment distribution of points on the optical surface of the object under test to points in the module plane. In particular, this further position assignment distribution can be determined directly from the design data of the diffractive optical test module provided it is ensured that the accuracy of the production of the diffractive structure pattern of the test module and the adjustment of the object under test in relation to the test module are sufficiently accurate.

According to a further embodiment, the test wave generated by the test module has a rotationally symmetric wavefront which is adapted to the target shape of the optical surface such that its maximum deviation from the target shape is between 100 nm and 10 µm. Hence, the test wave is suitable for measuring a so-called nano free-form surface.

Expressed differently, the wavefront of the test wave has a two-dimensional deviation distribution in relation to the target shape. The maximum value of the deviation distribution in terms of magnitude ranges between 100 nm and 10 µm. According to different embodiments, the maximum deviation of the wavefront of the test wave from the target shape is at least 200 nm, at least 300 nm, at least 400 nm or at least 500 nm and no more than 10 µm, at least 5 µm, no more than 2 µm or no more than 1 µm. The configuration of the wavefront of the test wave in rotationally symmetric form allows the accuracy of the shape measurement to be improved by way of rotational averaging of the measurement results.

According to a further embodiment, the test module comprises a diffractive test pattern configured to generate the test wave and comprises adjustment structures for determining the lateral position of the test module in the detector plane. The position assignment distribution determined using the calibration module can be assigned precisely using the adjustment structures. According to an embodiment variant, the calibration module comprises, at least in sections, diffractive calibration patterns which each have an identical configuration, and the adjustment structures are formed, at least in part, by the calibration pattern of the test module.

According to a further embodiment, the calibration pattern of the test module surrounds a diffractive test pattern configured to generate the test wave.

According to a further embodiment, the test module and the calibration module comprise, at least in sections, diffractive calibration patterns which each have an identical configuration, the calibration pattern of the test module having a cutout for a diffractive test pattern configured to generate the test wave. According to an embodiment variant, the cutout is arranged in at least one central region of the calibration pattern.

Furthermore, an optical element comprising an optical surface is provided according to the invention. This optical surface is assigned a non-rotationally symmetric target shape, the maximum deviation of which from a best-adapted rotationally symmetric reference surface is between 100 nm and 100 µm. Furthermore, a maximum deviation of an actual shape of the optical surface from the target shape is no more than $\frac{1}{1000}$ of the maximum deviation of the target shape from the rotationally symmetric reference surface.

For instance, in an exemplary case where the maximum deviation of the target shape from the rotationally symmetric reference surface is 100 nm, the maximum deviation of the actual shape of the optical surface from the target shape is no more than 0.1 nm.

The maximum deviation of the target shape from the best-fitted rotationally symmetric reference surface is, as a rule, approximately half the difference between the greatest peak and the deepest valley (the so-called peak-to-valley value) of a two-dimensional distribution obtained by calculating the difference between the target shape and the rotationally symmetric reference surface. The best-fitted rotationally symmetric reference surface should be understood to mean the rotationally symmetric face whose maximum deviation from the target shape is the smallest.

Analogously, the maximum deviation of the actual shape of the optical surface from the target shape is, as a rule, approximately half the difference between the greatest peak and the deepest valley (peak-to-valley value) of a two-dimensional distribution obtained by calculating the difference between the actual shape and the target shape.

According to a further embodiment, the lower limit of the maximum deviation of the non-rotationally symmetric target shape from a rotationally symmetric reference surface is at least 200 nm, in particular at least 300 nm or at least 500 nm. According to a further embodiment, the upper limit of the maximum deviation of the non-rotationally symmetric target shape from a rotationally symmetric reference surface is no more than 50 µm, in particular no more than 10 µm or no more than 1 µm.

According to an embodiment, the reference surface is a rotationally symmetric asphere. According to an embodiment variant, the deviation between the rotationally symmetric reference surface and any spherical surface is at least 200 µm, in particular at least 500 µm.

In particular, the optical element is configured for a microlithographic imaging optical system. In particular, the imaging optical system is a projection lens of a microlithographic projection exposure apparatus. According to one embodiment, the optical element is a nano free-form surface.

According to a further embodiment, the rotationally symmetric reference surface has a deviation of at least 100 µm, in particular at least 200 µm from any spherical surface.

According to a further embodiment of the optical element, the maximum deviation of the actual shape of the optical surface from the target shape is no more than $\frac{1}{10\,000}$, in particular no more than $\frac{1}{20\,000}$ or no more than $\frac{1}{50\,000}$ of the maximum deviation of the target shape from the rotationally symmetric reference surface.

According to a further embodiment, the maximum deviation of the actual shape of the optical surface from the target shape is no more than 0.2 nm, in particular no more than 0.1 nm or no more than 0.05 nm.

Furthermore, a diffractive optical element comprising a diffractive structure pattern having a grating-shaped basic structure is provided. The grating-shaped basic structure has such a modulation that this facilitates the determination of the position of the diffractive structure pattern on the basis of an interferogram recorded by a detector, with an accuracy that is better than a spacing between two adjacent pixels of the detector. The interferogram is generated by superimposing a wave extending across the diffractive structure pattern with a reference wave.

Expressed differently, the accuracy with which the position is determined is better than the pixel resolution of the detector, that is to say the accuracy value is below the pixel resolution of the detector. Depending on the detector, the distance between two adjacent pixels may be less than 20 µm, less than 10 µm, less than 5 µm, in particular approximately 2 to 3 µm. In this case, the wave extending across the diffractive structure pattern can be superimposed with the reference wave in an interferometric measuring device provided to this end, for instance in the form of a Fizeau interferometer. The statement that the wave superimposed with the reference wave for generating the interferogram runs over the diffractive structure pattern should be understood to mean that the wave has interacted with the diffractive structure pattern, that is to say either has been reflected at the diffractive structure pattern or has passed through the latter, before the interferogram is generated.

In particular, the diffractive structure pattern has a two-dimensionally modulated optical property which is impressed on the diffracted wave and, following superimposition of the reference wave, appears in the interferogram on the detector as a grating-shaped phase modulation, on the basis of which the phase modulation can be determined.

According to different embodiments, the modulation is configured such that determining the position of the diffractive structure pattern is facilitated with an accuracy that is better than one fifth, better than one tenth or better than one twentieth of the distance between two adjacent pixels of the detector.

As a result of the modulation of the diffractive structure pattern, a variation, known in advance, is generated in the wavefront of the wave extending across the diffractive structure pattern and hence a corresponding two-dimensional structure, known in advance, is generated in the interference pattern, for instance a checkerboard-like interference pattern. However, unlike what the expression could be construed to imply, such a checkerboard-like structure does not have a modulation with constant regions and discontinuities therebetween. Rather, the curve of the modulation is continuous with finite gradients. With this two-dimensional structure, the interference pattern can be evaluated, with advance knowledge of the two-dimensional structure modulated thereon, by way of suitable algorithms, for example by fitting or a convolution, and hence the position of the diffractive structure pattern can be determined with a resolution that exceeds the pixel resolution of the detector. In particular, the variation of the wavefront, known in advance, has a periodic structure.

According to an embodiment of the diffractive optical element, the modulation of the diffractive structure pattern is a phase modulation, that is to say the diffractive structure pattern is configured as a phase grating.

According to a further embodiment, the modulation is periodic. In particular, the modulation is cosine-shaped; by way of example, the diffractive structure pattern is a twice cosine-modulated phase grating.

The features specified in relation to the embodiments, the embodiment examples and embodiment variants, etc., listed above and other features of the embodiments according to the invention are explained in the description of the figures and the claims. The individual features can be implemented, either separately or in combination, as embodiments of the invention. Furthermore, they can describe advantageous embodiments which are independently protectable and protection for which is claimed if appropriate only during or after pendency of the application.

BRIEF DESCRIPTION OF THE DRAWINGS

The above and further advantageous features of the invention are illustrated in the following detailed description of exemplary embodiments according to the invention with reference to the accompanying schematic drawings. In the drawings.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
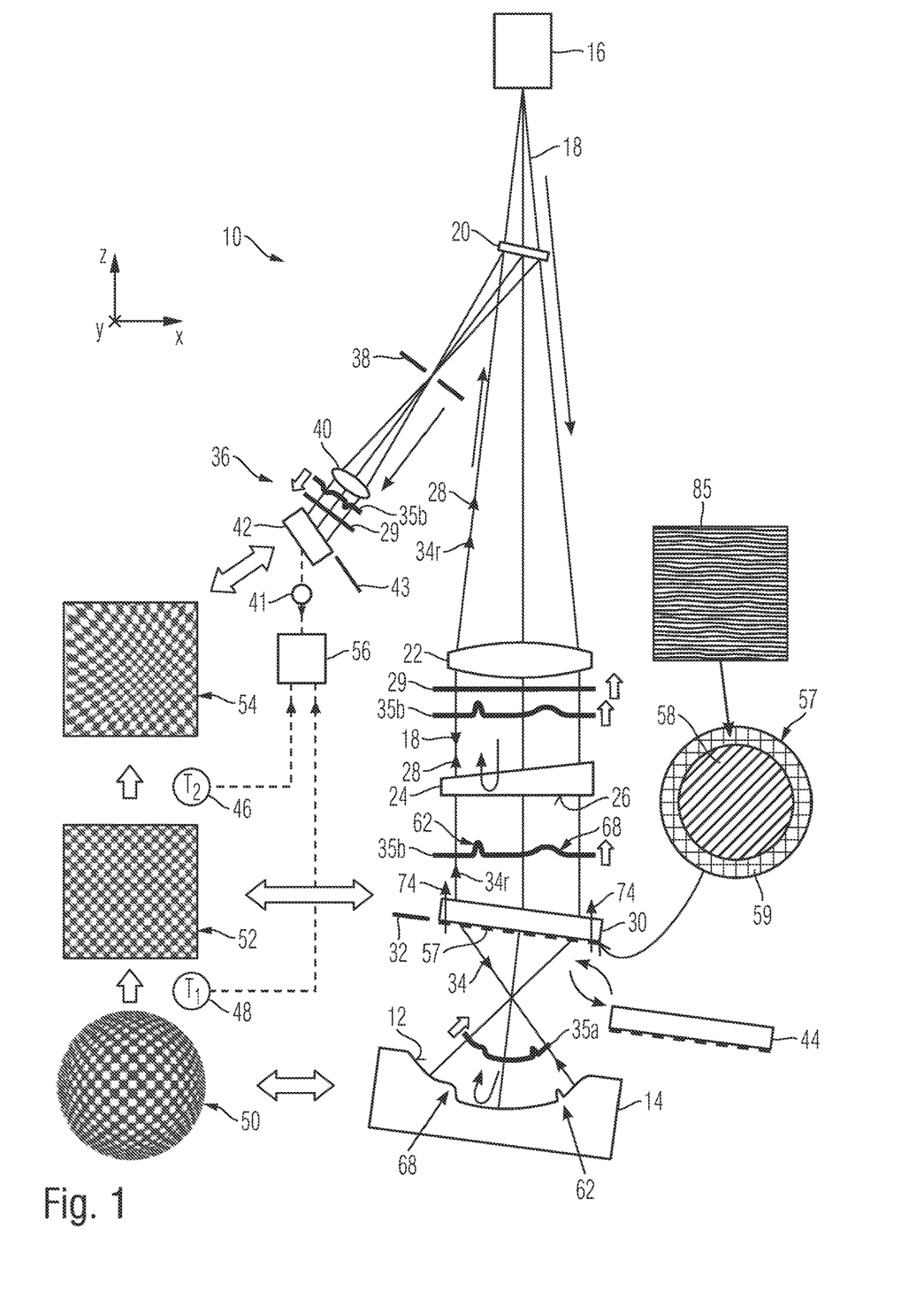
FIG. 1 shows an embodiment of a measuring device for interferometrically determining the shape of an optical surface of an object under test, comprising a diffractive optical test module that is arranged in a module plane and is configured to generate a test wave which is radiated onto the optical surface.

In order to facilitate the description, a Cartesian xyz-coordinate system is indicated in the drawing, from which system the respective positional relationship of the components illustrated in the figures is evident. In FIG. 1, the y-direction extends perpendicularly to the plane of the drawing into this plane, the x-direction extends toward the right, and the z-direction extends upward.

FIG. 1 depicts an exemplary embodiment of a measuring device 10 for interferometrically determining the shape of an optical surface 12 of an object under test 14. The measuring device 10 can be used, in particular, to determine a deviation of the actual shape of the surface 12 from a target shape. By way of example, a non-spherical surface may be provided as the surface 12 to be measured.

The measuring device 10 is particularly suitable for measuring a surface 12 of a mirror of a microlithographic projection lens. This surface 12 can be configured for reflecting extreme ultraviolet (EUV) radiation, that is to say radiation with a wavelength of less than 100 nm, in particular a wavelength of approximately 13.5 nm or approximately 6.8 nm. The non-spherical surface of the mirror can be what is known as a "nano free-form surface", for example.

Figure 3:
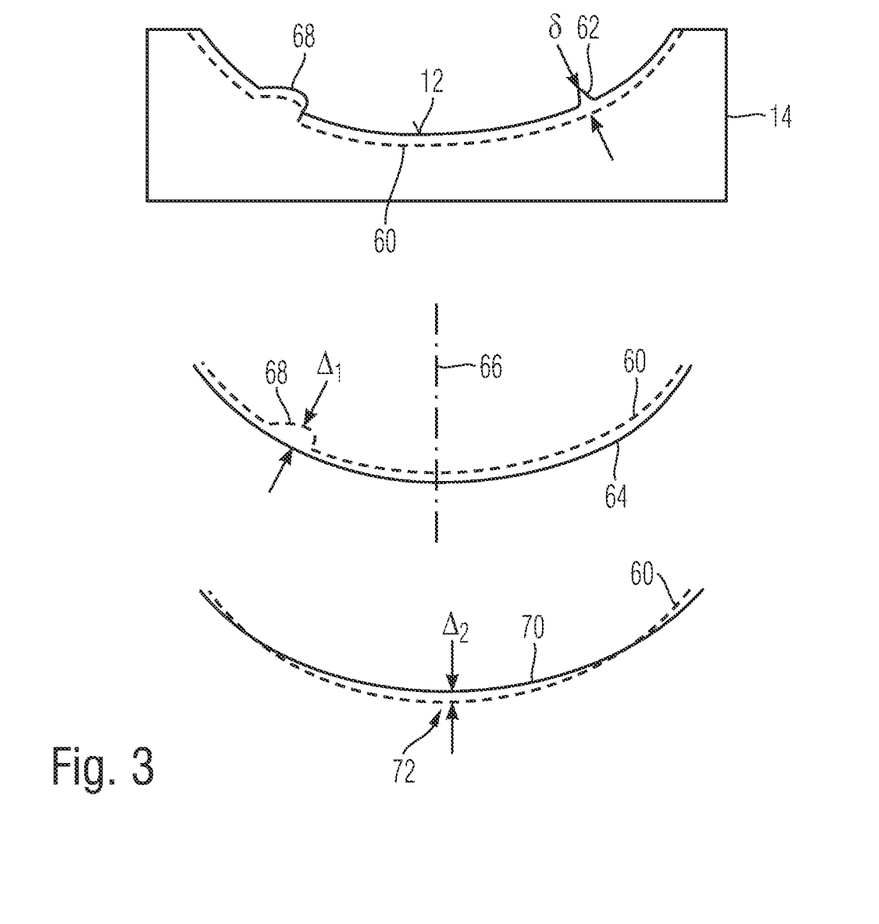
FIG. 3 shows a more detailed illustration of an optical surface of a test object, and of target faces and reference surfaces, which are assigned to the optical surface.

FIG. 3 illustrates the optical surface 12 in the form of such a "nano free-form surface", shown in FIG. 1, in more detail. A target shape 60 is assigned to the optical surface 12 and has a so-called free-form deviation distribution h(x,y) from a best-fitted rotationally symmetric reference surface 64, the maximum value $\Delta_1$ of this distribution ranging between 100 nm and 100 µm, in particular between 100 nm and 10 µm. Such a deviation 68 of the target shape 60 from the best-fitted rotationally symmetric reference surface 64 with a deviation value of $\Delta_1$ is plotted in FIG. 3 in exemplary fashion. In the present illustration, this represents the greatest deviation of the target shape 60 from the reference surface 64, that is to say the specified maximum deviation is $\Delta_1$. According to one embodiment, the best-fitted rotationally symmetric reference surface 64 can be understood to mean the rotationally symmetric face whose maximum deviation $\Delta_1$ from the target shape 60 is the smallest. Alternatively, the best-fitted rotationally symmetric reference surface 64 can also be determined by minimizing the root mean square—abbreviated RMS—of the deviation $\Delta_1$ ($\sqrt{<|\Delta_1|^2>}$) or by minimizing the mean deviation $<|\Delta_1|>$.

The actual shape of the optical surface 12, in turn, typically has deviations from the target shape 60 on account of manufacturing errors. Such a deviation 62 is plotted in FIG. 3 in exemplary fashion. In this case, the deviation 62 represents a maximum deviation, with the value δ, of the actual shape of the optical surface 12 from the target shape 60. What should be noted here is that, for illustrative purposes, the deviation 62 is illustrated in FIG. 3 with a deflection similar to that of the deviation 68, but, in reality, δ is typically substantially smaller than $\Delta_1$. By way of example, δ can be approximately 0.2 nm, in particular approximately 0.05 nm. Therefore, a "nano free-form surface" can also be defined by virtue of its actual form 12 having a maximum deviation from its best-fitted rotationally symmetric reference surface 60 of between 100 nm and 10 µm.

The rotationally symmetric reference surface 64 can be specified by a minimum value $\Delta_2$ for its maximum deviation 72 from a best-fitted spherical surface 70. The best-fitted spherical surface should be understood to mean the sphere whose maximum deviation from the rotationally symmetric reference surface 60 is the smallest. The specification of the maximum deviation by the minimum value $\Delta_2$ can therefore also be related to the maximum deviation 72 from any spherical surface, that is to say by virtue of specifying that the rotationally symmetric reference surface 60 has a deviation of at least $\Delta_2$ in relation to any spherical surface. According to one embodiment, $\Delta_2$ may also be approximately 0 µm; in this case, the rotationally symmetric reference surface 64 is a sphere.

The measuring device 10 illustrated in FIG. 1 comprises a light source 16 for providing sufficiently coherent measurement radiation as an input wave 18 in the form of an expanded wave. In this case, the light source 16 may have, for example, a laser with a beam-expanding optical unit. By way of example, a frequency doubling Nd:Yag laser with a wavelength of approximately 532 nm or a helium-neon laser with a wavelength of approximately 633 nm can be provided to this end. However, the measurement radiation may also have a different wavelength in the visible or non-visible wavelength range of electromagnetic radiation. The light source 16 constitutes merely one example of a light source that may be used for the measuring arrangement 10.

The measurement radiation provided by the light sources 16 leaves the light source 16 as an input wave 18 with a spherical wavefront and propagates divergently. In this case, the input wave 18 initially passes through a beam splitter 20 and subsequently strikes a collimator 22 for converting the wavefront of the input wave 18 into a planar wavefront.

Next, a reference element 24 in the form of a Fizeau element with a Fizeau face 26 for splitting off a reference wave 28 in reflection is situated in the beam path of the input wave 18. The reference wave 28 returns in the direction of the collimator 22 and has a plane wavefront 29, as illustrated in FIG. 1.

The portion of the input wave 18 passing through the reference element 24 strikes a diffractive optical test module 30 in the form of a computer-generated hologram (CGH) with diffractive structures 57. The diffractive structures 57 comprise a diffractive test pattern 58 and a diffractive adjustment pattern 59 arranged in the surround of the test pattern 58. The diffractive adjustment pattern 59 can surround the test pattern 58 and have a ring-shaped form in this case, as shown in FIG. 1. Alternatively, it may only partly surround the test pattern 58 and, for instance, have the form of a ring section. As shown in FIG. 1, the diffractive test pattern 58 may be circular or else have any other form. In general, the adjustment pattern 59 can be configured such that it has a cutout, at least in a central region, for the diffractive test pattern 58 that generates the test wave 34. Alternatively, the cutout may also be arranged in an off-centered region. The diffractive optical test module 30 is arranged in a module plane 32, specifically it is arranged such that the diffractive structures 57 of the CGH are located in the module plane 32.

The diffractive test pattern 58 of the diffractive optical test module 30 is used to approximate the wavefront of the input wave 18 to the target shape 60 of the optical surface 12 to be measured that is illustrated in FIG. 3 and to consequently generate a test wave 34. In the aforementioned case where the optical surface 12 is configured as a so-called "nano free-form surface", the wavefront of the test wave 34 is adapted to the rotationally symmetric reference surface 64, from which the target shape 60 of the optical surface 12 deviates between 100 nm and 10 μm in accordance with the aforementioned embodiment.

The diffractive adjustment pattern 59 is configured to reflect the radiation of the input wave 18 incident thereon in Littrow reflection, that is to say back onto itself. The wave that is generated in this case is referred to as an adjustment wave 74. By way of example, the diffractive adjustment pattern 59 can be configured as a two-dimensionally cosine-modulated phase grating, as illustrated in a detailed view of the calibration pattern 85 in FIG. 1.

The test wave 34 is reflected at the optical surface 12 of the test object 14 and returns to the diffractive optical test module 30 as a returning test wave 34r. In this case, the returning test wave 34r has a wavefront 35a, impressed in which are both the deviation 62 of the optical surface 12 from the target shape 60 and the deviation 68 of the target shape 60 from the reference surface 64. After passing through the diffractive optical test module 30 again, the returning test wave 34r once again has a plane wavefront, in which, however, the deviations 62 and 68 are likewise impressed.

After passage through the reference element 24, the test wave 34r returns together with the reference wave 28 to the beam splitter 20. The beam splitter 20 guides the combination of the returning measurement wave 34r and the reference wave 28 out of the beam path of the input wave 18. Further, the measuring device 10 contains an acquisition apparatus 36 with a stop 38, an eyepiece 40 and an interferometer camera 42 for acquiring a test interferogram 41 generated by superimposing the reference wave 28 with the test wave 34r in a detector plane 43 or acquisition plane of the interferometer camera 42.

An evaluation apparatus 56 of the measuring device 10 determines the actual shape of the optical surface 12 of the test object 14 from one or more test interferograms 41 acquired by the interferometer camera 42. To this end, the evaluation apparatus 56 has a suitable data processing unit and uses corresponding calculation methods known to a person skilled in the art. According to the invention, the evaluation apparatus 56 uses a position assignment distribution $T_2$ (cf. reference sign 46) of points 52 in the module plane 32 to corresponding points 54 in the detector plane 43, which position assignment distribution is determined using a calibration module 44 and is explained in more detail below with reference to FIG. 2, and, in particular, a further position assignment distribution $T_1$ (cf. reference sign 48) of points 50 on the surface 12 of the object under test 14 to corresponding points 52 in the module plane 32 when evaluating the interferograms. An exemplary embodiment of the evaluation taking place in the evaluation apparatus 56 with regard to one or more of the test interferograms 41 for determining the actual shape of the optical surface 12 is described below with reference to the fourth process phase P4 in FIG. 4.

Alternatively or additionally, the measuring device 10 can contain a data memory or an interface to a network to make possible a determination of the surface shape using the test interferogram or interferograms 41 that is or are stored or transmitted via the network by way of an external evaluation unit.

By combining the position assignment distributions $T_1$ and $T_2$, the respective positions of the points 50, which are distributed like a grid over the surface 12 of the object under test 14, are assigned to the positions on the detector plane 43 on which the points 50 are imaged during the measurement operation of the measuring device 10 illustrated in FIG. 1. The corresponding positions in the detector plane 43 are characterized by the aforementioned points 54. Here, the position assignment distribution $T_1$ specifies the assignment of the points 50 on the surface 12 of the object under test 14 to the corresponding points 52 in the module plane 32 while the position assignment distribution $T_2$ in turn specifies the assignment of the points 52 to the corresponding points 54 in the detector plane 43.

According to an embodiment, the position assignment distribution $T_1$ is determined directly from the design data of the diffractive optical test module 30 using an optics design model. Here, the accuracy of the production of the diffractive test pattern 58 and the adjustment of the object under test 14 in relation to the test module 30 being sufficiently accurate is initially ensured. The position assignment distribution $T_1$ can be calculated externally and, as illustrated in FIG. 1, be transmitted to the evaluation apparatus 56. Alternatively, the position assignment distribution $T_1$ can also be calculated directly from the design data of the test pattern 58 by the evaluation apparatus 56.

The position assignment distribution $T_2$ reflects lateral imaging aberrations which are generated by the adjustment of the light source and the optical unit arranged between the module plane 32 and the detector plane 43, that is to say by the collimator 22, the beam splitter 20 and the eyepiece 40 in the present case. These lateral imaging aberrations may comprise imaging scale, orthogonality and further orders of lateral imaging aberrations which are referred to as distortion. For illustrative purposes, the arrangement of the points 54 in the detector plane 43, shown in FIG. 1, has a distortion in relation to the points 52 that are arranged in a regular grid in the module plane 32. As already mentioned above, the position assignment distribution $T_2$ is determined by measurement using the calibration module 44.

In the edge region of the test interferogram 41 corresponding to the ring-shaped adjustment pattern 59, the reference wave 28 is superimposed with the adjustment wave 74. The information contained in this region of the test interferogram 41 can firstly be used to adjust the test module 30 before the acquisition of the test interferogram or interferograms 41, used to determine the shape of the surface 12 of the object under test 14, in the module plane 32 in accordance with the positioning of the calibration module 44 present when determining the position assignment distribution $T_2$. Secondly, the information contained in the edge region of the test interferogram 41 can also be used to adapt by calculation the position assignment distribution $T_2$ determined using the calibration module 44 to the positioning of the test module 30 present when acquiring the test interferogram or interferograms 41 for determining the shape of the surface 12 of the object under test 14.

Figure 2:
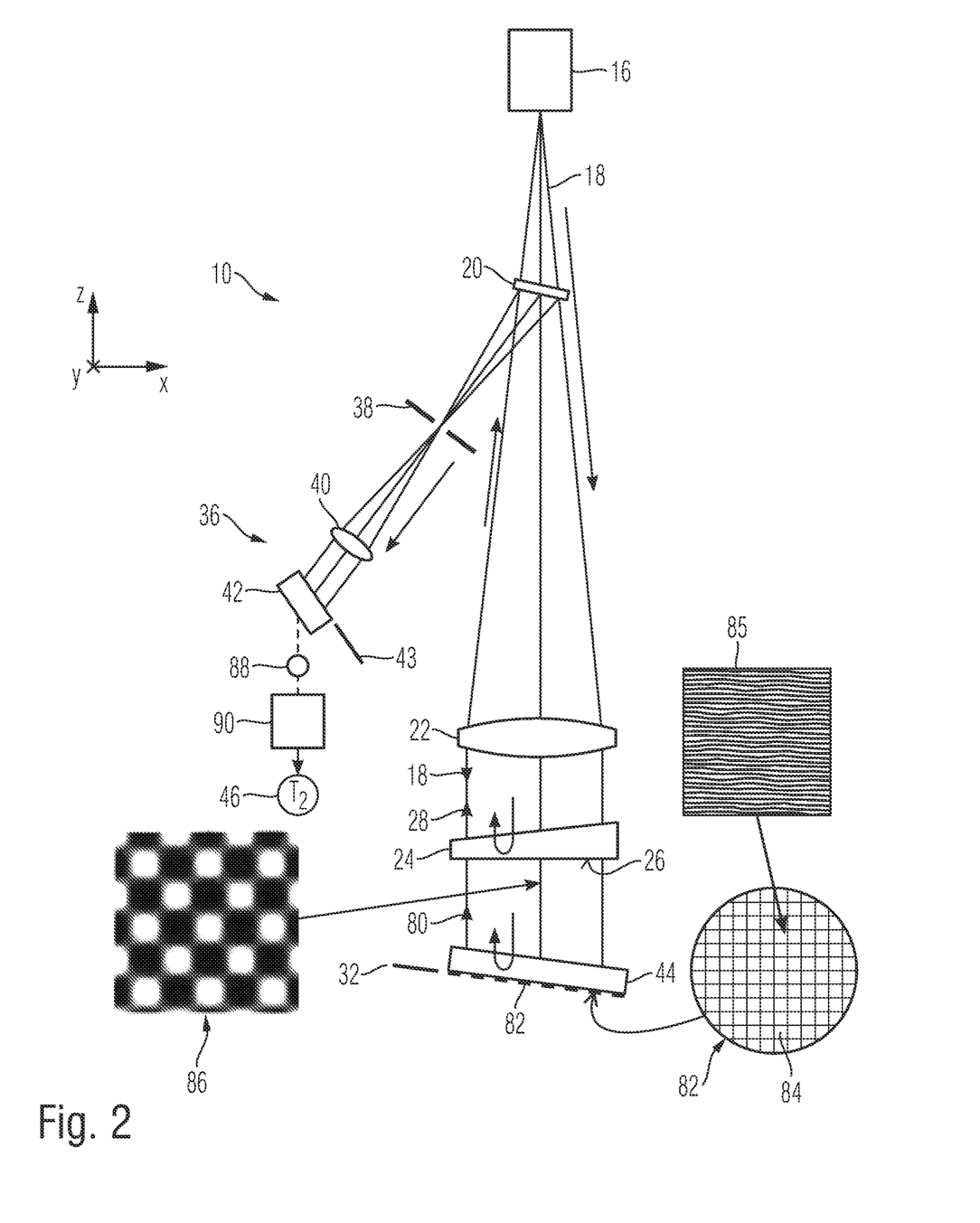
FIG. 2 shows the measuring device according to FIG. 1 when carrying out a calibration method, within the scope of which a calibration module is arranged in the module plane instead of the test module.

To determine the position assignment distribution $T_2$, the calibration module 44 is arranged in the module plane 32 of the measuring device 10 according to FIG. 1 instead of the test module 30, and so the arrangement illustrated in FIG. 2 arises. Like the optical test module 30, the calibration module 44 is configured as a computer-generated holograms (CGH) and comprises diffractive structures 82 in the form of a diffractive structure pattern, which is also referred to as diffractive calibration pattern 84 below. The diffractive calibration pattern 84 in the present embodiment is embodied in the form of a Littrow grating with a two-dimensional phase modulation flush over the entire beam cross section of the input wave 18. FIG. 2 shows, in a detailed view of the calibration pattern 85, an embodiment of the phase modulation in the form of a two-dimensional cosine grating.

Expressed differently, the calibration pattern 84 comprises a diffractive structure pattern which has a grating-shaped basic structure, wherein the grating-shaped basic structure has a phase modulation in turn. The phase modulation is configured such that this facilitates a determination of the position of the diffractive structure pattern in the module plane 32 on the basis of an interferogram, also referred to as calibration interferogram 88 below, recorded by the interferometer camera 42, which is also referred to as a detector, with an accuracy that is better than a distance between adjacent pixels of the detector. Hence, the accuracy of determining the position is better than the pixel resolution of the detector. According to further embodiments, the accuracy is better than one fifth, better than one tenth or better than one twentieth of the distance between two adjacent pixels of the detector.

By modulating the diffractive structure pattern of the calibration pattern 84, a variation, known in advance, in the wavefront of the wave extending across the diffractive structure pattern, that is to say of the calibration wave 80, is generated, which variation is generated at the calibration pattern 84 by the reflection of the input wave 18 back onto itself while having a two-dimensional phase signature 86 known in advance impressed thereon. As illustrated in FIG. 2, the impressed two-dimensional phase signature 86 may have a checkerboard-like structure, for example. However, unlike what the expression could be construed to imply, such a checkerboard-like structure does not have a modulation with constant regions and discontinuities therebetween. Rather, the curve of the modulation is continuous with finite gradients. Thus, in particular, the structure can be approximated to a twice cosine-modulated phase grating. Hence, a corresponding two-dimensional structure is generated in the calibration interferogram recorded by the interferometer camera 42. During the evaluation of the interference pattern, this two-dimensional structure can be fitted by way of suitable algorithms. On account of the prior knowledge of the two-dimensional structure, the position of the diffractive structure pattern can be determined with the aforementioned resolution, which exceeds the pixel resolution of the detector.

Expressed differently, the diffractive calibration pattern 84 is configured as a phase grating for reflecting the input wave 18 back onto itself while impressing a two-dimensional phase signature 86. Alternatively, the diffractive calibration pattern 84 can also be configured as a modulated intensity grating. What is known as a calibration wave 80 is generated by the Littrow reflection of the input wave at the diffractive calibration pattern 84.

By way of example, if a very precise electron beam writer is used to produce a calibration pattern 84, the lateral positioning of the structure elements, which bring about the modulation, on the calibration module 44 can be implemented with great accuracy. The accuracy when carrying out a correction of scale and orthogonality, which may be determined by way of a separate measurement of the placement using equipment that is conventional in lithography mask production, may be better than 100 nm. Hence, the calibration pattern 84 establishes a precise scale in the module plane 32. This scale is now measured with great precision by evaluating one or more calibration interferograms 88 that were generated by the superimposition of the reference wave 28 generated by reflection at the Fizeau face 26 with the calibration wave 80 in the detector plane 43. The evaluation is implemented in an evaluation apparatus 90 by measurement of the position of the peaks and valleys of the corresponding calibration interferogram 88 and by appropriate assignment to the corresponding structure elements of the calibration pattern 84. The result of this evaluation then is the position assignment distribution $T_2$.

The position assignment distribution $T_2$ preferably has an accuracy that is better than the resolution of the interferometer camera. Expressed differently, in relation to the pixel resolution of the interferometer camera 42, the position assignment distribution $T_2$ facilitates a sub-pixel accurate position assignment of coordinates of the test module 30 in camera coordinates.

According to one embodiment, the ring-shaped adjustment pattern 59 of the diffractive optical test module 30 is configured analogously to the calibration pattern 85, that is to say the adjustment pattern 59 likewise has a phase modulation for a highly accurate determination of position. According to one embodiment variant, the adjustment pattern 59 is structurally identical to the calibration pattern 85 of the calibration module 44, that is to say both patterns for example comprise identical two-dimensionally cosine-modulated phase gratings. Preferably, the edge region of the calibration pattern 85 of the calibration module 44 therefore identically corresponds to the ring-shaped adjustment pattern 59 of the test module 30. This allows the test module 30 to be placed exactly at the identical lateral position in the module plane 32. The lateral assignment between positions in the detector plane 43 and in the module plane 32 from the measurement with the calibration module 44 is accordingly also valid during the measurement with the test module 30.

Figure 4:
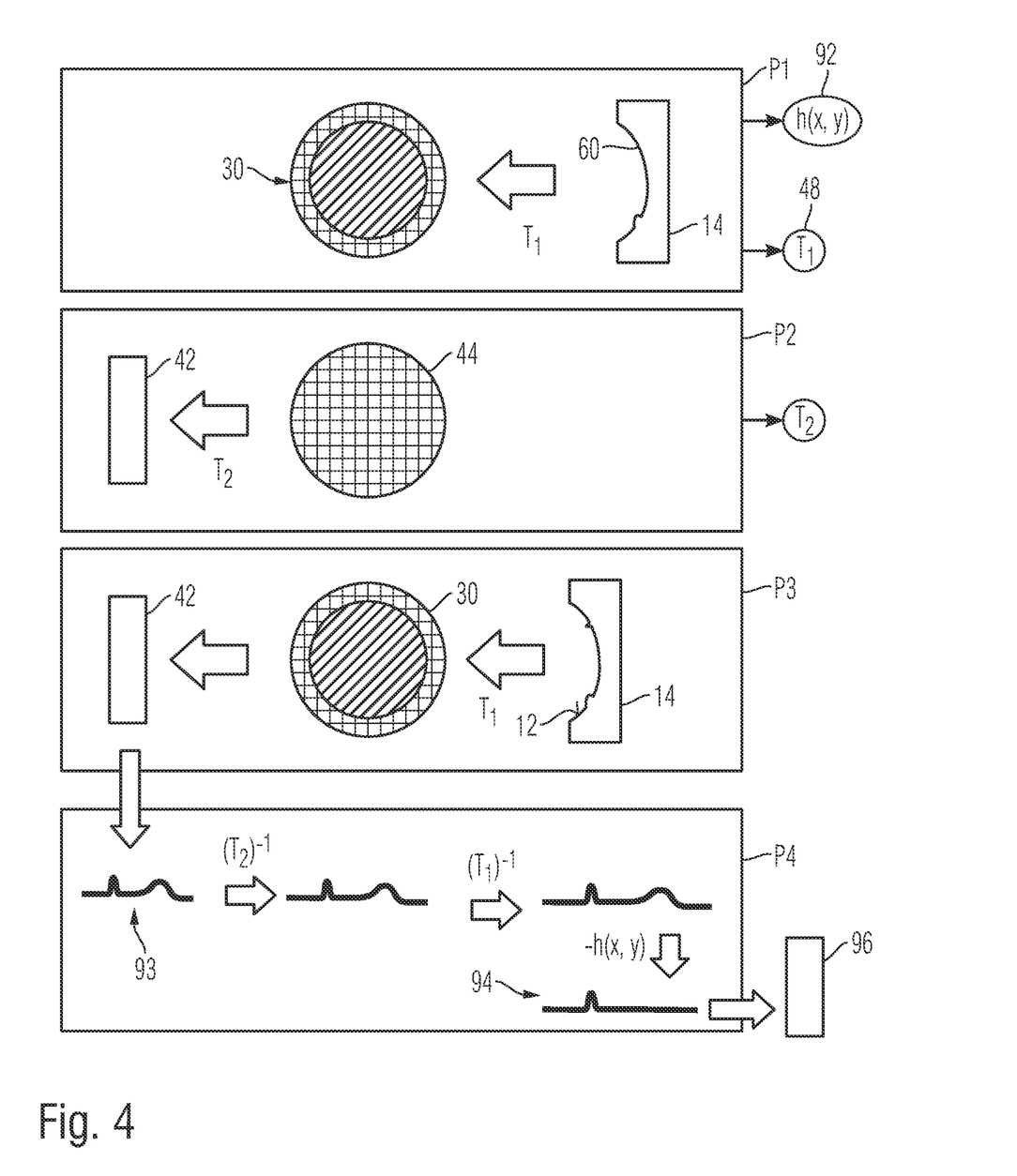
FIG. 4 shows an illustration of the data flow according to an embodiment of measuring the optical surface in the form of a nano free-form surface.

FIG. 4 illustrates the data flow according to an embodiment according to the invention of measuring the optical surface 12 in the form of a nano free-form surface. In a first process phase P1, the position assignment distribution $T_1$ in respect of the assignment of the points 50 on the surface 12 of the object under test 14 to the corresponding points 52 in the module plane 32 is determined using an optics design model from the design data of the diffractive test pattern 58 of the test module 30. Furthermore, the free-form deviation distribution h(x,y) which is denoted by reference sign 92 and which—as already mentioned above—specifies the deviation of the target shape 60 from the rotationally symmetric reference surface 64 is determined from the specifications underlying the design of the diffractive test pattern 58. In a second process phase P2, when the calibration module 44 is arranged in the module plane 32 according to FIG. 2, the measuring device 10 is used to determine the position assignment distribution $T_2$ in relation to the assignment of the points 52 in the module plane 32 to the corresponding points 54 on the interferometer camera 42 that is arranged in the detector plane 43.

In a third process phase P3, the surface 12 of the object under test 14 is measured with the measuring device 10 while the test module 30 is arranged in the module plane 32 in accordance with FIG. 1. The measurement data 92 in camera coordinates taken in the process from the test interferogram or interferograms 41 recorded by the interferometer camera 42 are subsequently evaluated in the evaluation apparatus 56 in a fourth process phase P4. In this case, the measurement data 93 are calculated back into the module plane 32 using the inverse position assignment distribution $(T_1)^{-1}$ and into the coordinate system of the surface 12 using the inverse position assignment distribution $(T_2)^{-1}$. The back-calculation of the measurement data 93 into the module plane 32 and into the coordinate system of the surface 12 can be implemented sequentially. Alternatively, it is also possible to construct a model of the overall distortion which also contains the design distortion $T_1$ and to determine remaining model parameters by way of the distortion measurement, the model parameters taking account of components which may occur both before and after the design distortion $T_1$ within the scope of the overall distortion.

Subsequently, the free-form deviation distribution h(x,y) is subtracted and hence the shape deviation 94 of the optical surface 12 from the target shape 60 is determined. The shape deviation 94 represents processing data in device-under-test coordinates, which can now be transmitted to a processing machine 96 for post-processing of the optical surface 12. In turn, the actual shape of the optical surface 12 can be determined by adding the shape deviation 94 to the target shape 60.

The above description of exemplary embodiments, embodiments or embodiment variants should be understood to be by way of example. The disclosure effected thereby firstly enables the person skilled in the art to understand the present invention and the advantages associated therewith, and secondly encompasses alterations and modifications of the described structures and methods that are also obvious in the understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS

10 Measuring device
12 Optical surface
14 Object under test
16 Light source
18 Input wave
20 Beam splitter
22 Collimator
24 Reference element
26 Fizeau surface
28 Reference wave
29 Wavefront of the reference wave
30 Diffractive optical test module
32 Module plane
34 Test wave
34r Returning test wave
35a Wavefront of the returning test wave
35b Wavefront of the returning test wave
36 Acquisition device
38 Stop
40 Eyepiece
41 Test interferogram
42 Interferometer camera
43 Detector plane
44 Calibration module
46 Position assignment distribution
48 Further position assignment distribution
50 Points on the surface of the object under test
52 Points on the module plane
54 Points in the detector plane
56 Evaluation apparatus
57 Diffractive structures
58 Diffractive test pattern
59 Adjustment pattern
60 Target shape
62 Deviation from the target shape
64 Rotationally symmetric reference surface
66 Axis of symmetry
68 Deviation from the reference surface
70 Best-fitted spherical surface
72 Maximum deviation from the spherical surface
74 Adjustment wave
80 Calibration wave
82 Diffractive structures
84 Diffractive calibration pattern
85 Detailed view of the calibration pattern
86 Phase signature
88 Calibration interferogram
90 Evaluation apparatus
92 Free-form deviation distribution h(x,y)
93 Measurement data in camera coordinates
94 Shape deviation
96 Processing machine

What is claimed is:

1. A method for calibrating a measuring device for interferometrically determining a shape of an optical surface of an object under test, wherein the measuring device comprises a module plane for the arrangement of a diffractive optical test module which is configured to generate a test wave that is directed at the optical surface and that has a wavefront at least approximately adapted to a target shape of the optical surface, said method comprising:
    arranging a diffractive optical calibration module in the module plane for generating a calibration wave,
    acquiring a calibration interferogram generated with the calibration wave in a detector plane of the measuring device, and
    determining a position assignment distribution of points in the module plane to corresponding points in the detector plane from the acquired calibration interferogram.

2. The method as claimed in claim 1,
    further comprising determining a distortion of an optical unit arranged between the module plane and the detector plane by determining the position assignment distribution.

3. The method as claimed in claim 1,
    wherein the calibration module has a diffractive structure pattern with a configuration known in advance and the configuration known in advance is used during the determination of the position assignment distribution.

4. The method as claimed in claim 3,
    wherein the diffractive structure pattern of the calibration module comprises a two-dimensionally modulated optical property.

5. The method as claimed in claim 4,
    wherein the two-dimensionally modulated optical property brings about a phase modulation in a wave that interacts with the diffractive structure pattern.

6. A method for determining a shape of an optical surface of an object under test, comprising:
    carrying out the calibration method as claimed in claim 1 for determining the position assignment distribution of points in the module plane to corresponding points in the detector plane,
    arranging the test module in the module plane for generating the test wave that is directed at the optical surface, and
    recording a test interferogram generated with the test wave.

7. The method as claimed in claim 6,
    further comprising determining the shape of the optical surface from the test interferogram using the position assignment distribution.

8. The method as claimed in claim 7,
    further comprising implementing the determination of the shape of the optical surface in accordance with a position assignment distribution of points on the optical surface of the object under test to points in the module plane.

9. The method as claimed in claim 6, wherein the test wave generated by the test module has a rotationally symmetric wavefront which is adapted to the target shape of the optical surface such that a maximum deviation of the test wave from the target shape is between 100 nm and 10 µm.

10. The method as claimed in claim 6, wherein the test module comprises a diffractive test pattern configured to generate the test wave and comprises adjustment structures for determining the lateral position of the test module in the detector plane.

11. The method as claimed in claim 10, wherein the calibration module comprises diffractive calibration patterns which each have, at least in sections, an identical configuration, and the adjustment structures are formed, at least in part, by the calibration pattern of the test module.

12. The method as claimed in claim 10, wherein the calibration pattern of the test module surrounds a diffractive test pattern configured to generate the test wave.

* * * * *

UNITED STATES PATENT AND TRADEMARK OFFICE
CERTIFICATE OF CORRECTION

PATENT NO. : 11,774,237 B2
APPLICATION NO. : 17/676468
DATED : October 3, 2023
INVENTOR(S) : Hetzler et al.

It is certified that error appears in the above-identified patent and that said Letters Patent is hereby corrected as shown below:

In the Claims

Column 11, Line 22, delete "wave18" and insert -- wave 18 --.

Signed and Sealed this
Ninth Day of April, 2024

Katherine Kelly Vidal
*Director of the United States Patent and Trademark Office*